United States Patent
Ho

(10) Patent No.: US 11,086,472 B1
(45) Date of Patent: Aug. 10, 2021

(54) APPLYING A VISUAL EFFECT TO A REGION OF A CONTENT ITEM RESPONSIVE TO DETECTING A USER ACTION IN CONJUNCTION WITH PRESENTING THE CONTENT ITEM AT A CLIENT DEVICE

(71) Applicant: Facebook, Inc., Menlo Park, CA (US)

(72) Inventor: Tsun-Tsun Ho, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/019,409

(22) Filed: Jun. 26, 2018

(51) Int. Cl.
*G06F 3/0346* (2013.01)
*G06F 3/0481* (2013.01)
*G06F 3/0484* (2013.01)
*G06T 13/80* (2011.01)
*G06N 20/00* (2019.01)

(52) U.S. Cl.
CPC ........ *G06F 3/04812* (2013.01); *G06F 3/0346* (2013.01); *G06F 3/04842* (2013.01); *G06N 20/00* (2019.01); *G06T 13/80* (2013.01)

(58) Field of Classification Search
CPC .. G06F 3/0488; G06F 3/04812; G06F 3/0346; G06F 3/04842; G06T 13/80
See application file for complete search history.

(56) References Cited

U.S. PATENT DOCUMENTS

| | | | |
|---|---|---|---|
| 2012/0256866 A1* | 10/2012 | Yu | G06F 1/1694 345/173 |
| 2013/0147904 A1* | 6/2013 | Vivekanandan | H04N 7/15 348/14.08 |
| 2016/0256082 A1* | 9/2016 | Ely | A61B 5/0015 |
| 2018/0115790 A1* | 4/2018 | Kim | H04N 21/23439 |
| 2019/0096113 A1* | 3/2019 | Stukalov | G06T 13/00 |

OTHER PUBLICATIONS

Chao Shen et al., On Motion Sensors as Source for User Input Inference in Smartphones, Mar. 1, 2015, IEEE Xplore, pp. 1-6 (Year: 2015).*

Masahide Naemura et al., Real-time LDCRF-based method for inferring TV viewer interest, Jan. 17, 2014, IEEE Computer Society, pp. 485-491 (Year: 2014).*

\* cited by examiner

*Primary Examiner* — Tam T Tran
(74) *Attorney, Agent, or Firm* — Fenwick & West LLP

(57) ABSTRACT

An online system receives information from a content-providing user of the online system defining a content format of a content item associated with the content-providing user. The content format describes a user action detectable at a client device at which the content item is being presented, a visual effect, and a region of the content item to which the visual effect is to be applied in response to detecting the user action at the client device in conjunction with presenting the content item. The online system sends the content item for display to a viewing user of the online system via a client device associated with the viewing user. Responsive to detecting the user action by one or more sensors associated with the client device while the content item is being presented at the client device, the online system applies the visual effect to the region of the content item.

23 Claims, 4 Drawing Sheets

APPLYING A VISUAL EFFECT TO A REGION OF A CONTENT ITEM RESPONSIVE TO DETECTING A USER ACTION IN CONJUNCTION WITH PRESENTING THE CONTENT ITEM AT A CLIENT DEVICE

BACKGROUND

This disclosure relates generally to online systems, and more specifically to applying a visual effect to a region of a content item responsive to detecting a user action in conjunction with presenting the content item at a client device.

An online system allows its users to connect and communicate with other online system users. Users create profiles in the online system that are tied to their identities and include information about the users, such as interests and demographic information. The users may be individuals or entities such as corporations or charities. Because of the popularity of online systems and the significant amount of user-specific information maintained in online systems, an online system provides an ideal forum for allowing users to share content by creating content items for presentation to additional online system users. For example, users may share photos or videos they have uploaded by creating content items that include the photos or videos that are presented to additional users to whom they are connected in the online system.

Conventionally, online systems allow content-providing users of the online systems to specify content formats of content items they create for presentation to other online system users, such that the content items may include photos, videos, links to websites, etc. For example, a content item encouraging online system users to donate to a charity may have a content format including a video and a link, such that the content item includes a video about the charity and a link to a website for the charity at which a donation may be made. As an additional example, a content item associated with an event may have a content format including a carousel, such that photographs taken at the event are presented in a carousel that automatically rotates the photographs without user interaction with the content item by an online system user to whom the content item is being presented.

To encourage user engagement with online systems, online systems may favor the selection of content items having particular content formats for presentation to online system users, in which the content formats allow the users to interact with the content items. For example, since content items having content formats that include videos may require online system users to click on a play button before the videos will begin to play, an online system may favor the selection of such content items over other types of content items having content formats that do not allow for user interaction with the content items (e.g., those that include only static images or text). However, the extent to which online system users may interact with content items having traditional content formats is often minimal (e.g., clicking on a play button associated with a video or clicking on a link included in a content item). Therefore, presenting content items having traditional content formats may not be effective at maximizing user engagement with online systems.

SUMMARY

Conventionally, online systems allow content-providing users of the online systems to specify content formats of content items they create for presentation to other online system users to include photos, videos, links to websites, etc. To encourage user engagement with online systems, when selecting content items for presentation to online system users, online systems may favor the selection of content items having content formats that allow the users to interact with the content items. However, presenting content items having traditional content formats may not be effective at maximizing user engagement with online systems since the extent to which online system users may interact with content items having traditional content formats is often minimal.

To allow users of an online system to interact with content items to a greater extent, the online system receives information from a content-providing user of the online system defining a content format of a content item associated with the content-providing user, in which the content format allows viewing users of the online system to interact with the content item by moving a client device at which the content item is being presented. Rather than allowing a viewing user to view more of a panoramic or 360-degree image included in the content item in response to tilting a client device at which the content item is presented, a visual effect is applied to a region within the content item in response to detecting a user action at the client device in conjunction with presenting the content item in a display area of the client device. For example, a visual effect corresponding to snow falling or liquid pouring is applied to a region of the content item in response to detecting that a client device at which the content item is being presented is being shaken or tilted.

The information received from the content-providing user defining the content format of the content item describes a user action detectable at a client device at which the content item is being presented, a visual effect, and a region of the content item to which the visual effect is to be applied in response to detecting the user action at the client device. Upon identifying an opportunity to present content to a viewing user of the online system, the online system sends the content item for display to the viewing user via a client device associated with the viewing user. Responsive to detecting the user action by one or more sensors associated with the client device in conjunction with presenting the content item at the client device, the online system applies the visual effect to the region of the content item.

In some embodiments, the information received from the content-providing user defining the content format of the content item includes code that causes the visual effect to be applied to the region of the content item in response to detecting the user action at a client device in conjunction with presenting the content item. In various embodiments, the user action may be defined based at least in part on a set of APIs (Application Programming Interfaces) that allow the online system to access data (e.g., raw motion data) collected by one or more sensors associated with a client device in real time. Furthermore, in some embodiments, the online system may receive the information describing the content format of the content item from the content-providing user via a template maintained in the online system. In such embodiments, the information describing the content format may be received in conjunction with a request to create the content item.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
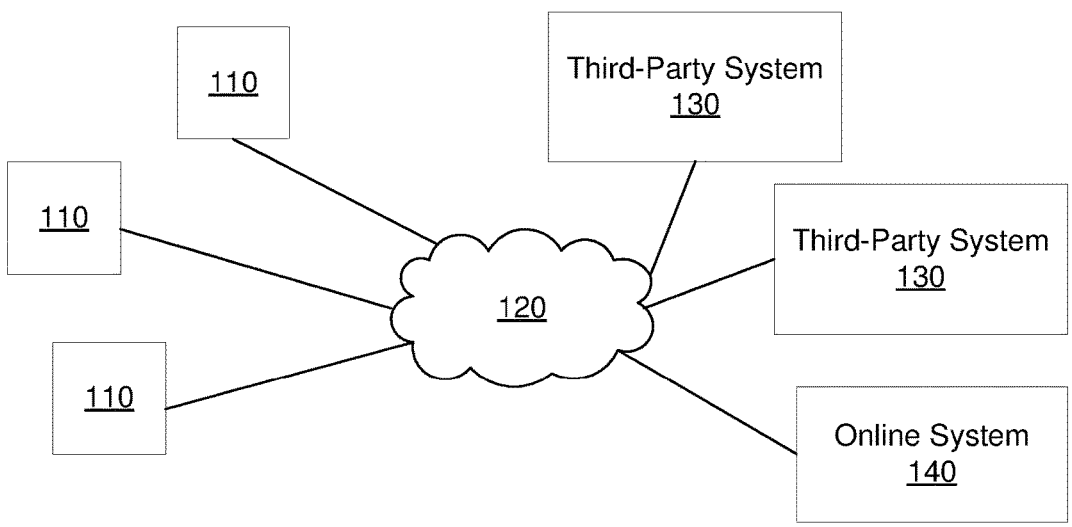
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 (e.g., a content publisher) provides content or other information for presentation via a client device 110. A third-party system 130 also may communicate information to the online system 140, such as advertisements, content, or information about an application provided by the third-party system 130.

Figure 2:
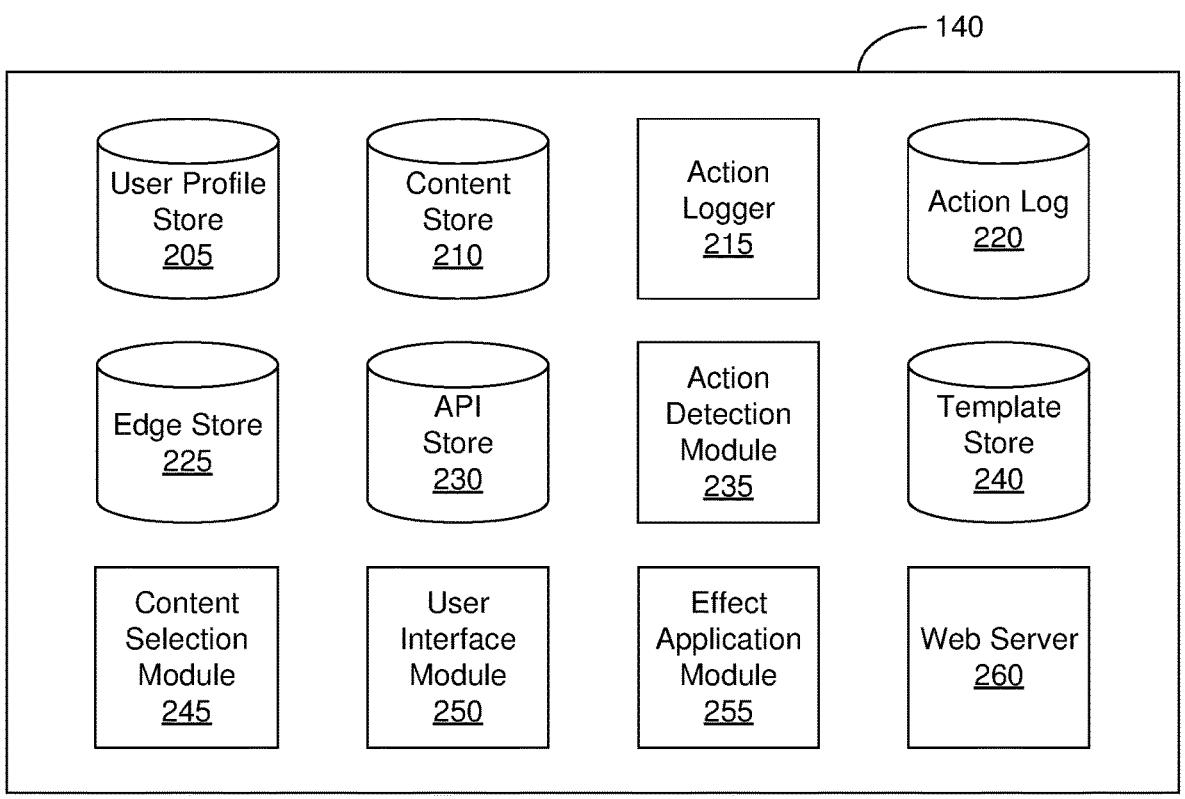
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an API store 230, an action detection module 235 a template store 240, a content selection module 245, a user interface module 250, an effect application module 255, and a web server 260. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more attributes for the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image. A user profile in the user profile store 205 also may maintain references to actions by the corresponding user performed on content items in the content store 210 and stored in the action log 220.

While user profiles in the user profile store 205 frequently are associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., a brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

In some embodiments, the online system 140 also may store (e.g., as shown in step 310 of FIG. 3) information defining a content format of a content item received from a content-providing user of the online system 140 in the content store 210. In various embodiments, the online system 140 may store information defining a content format of a content item in the content store 210 in association with an object representing the content item. Information defining a content format of a content item may describe a user action that is detectable at a client device 110 at which the content item is being presented, a visual effect (e.g., rain falling, liquid pouring, etc.), and a region of the content item to which the visual effect is to be applied in response to detecting the user action at the client device 110.

A user action described by a content format of a content item may be detectable at a client device 110 by one or more sensors associated with the client device 110 (e.g., an accelerometer, a gyroscope, an altimeter, a barometer, a magnetic field sensor, a temperature sensor, a light sensor, a heart rate sensor, an infrared sensor, a GPS sensor, etc.). Examples of a user action detectable at a client device 110 include shaking the client device 110, moving the client device 110 at one or more speeds, tilting the client device 110 at one or more angles along one or more axes, etc. In various embodiments, a user action described by a content format of a content item may be defined based at least in part on a set of APIs (Application Programming Interfaces) that allow the online system 140 to access data (e.g., raw motion data) collected by one or more sensors associated with a client device 110 in real time.

A region of a content item to which a visual effect is to be applied may be identified by a content-providing user of the online system 140 in various ways. In some embodiments, a region of a content item to which a visual effect is to be applied may be identified based at least in part on a set of coordinates within the content item associated with the region. For example, if a region of a content item to which a visual effect is to be applied is rectangular in shape, a content-providing user of the online system 140 may identify the region by providing coordinates within the content item corresponding to an upper-left corner of the region and coordinates corresponding to a bottom-right corner of the region. As an additional example, if a region of a content item to which a visual effect is to be applied is circular in shape, a content-providing user of the online system 140 may identify the region by providing coordinates within the content item corresponding to a center of the region as well as a radius of the region. In embodiments in which a region of a content item to which a visual effect is to be applied is identified by a set of coordinates within the content item, the coordinates may be expressed in pixels or using any other suitable unit of measurement along an axis of the content item. In various embodiments, a region of a content item to which a visual effect is to be applied may correspond to an element within the content item. For example, if a content item includes an image of a cup, the visual effect may be applied to a region of the content item corresponding to the cup. In such embodiments, a boundary of the region may be identified by a content-providing user of the online system 140 (e.g., using a selection tool that may be used to trace the boundary).

Application of a visual effect to a region of a content item in response to detecting a user action at a client device 110 at which the content item is being presented may be defined in various ways. In some embodiments, application of a visual effect to a region of a content item in response to detecting a user action at a client device 110 may be defined based at least in part on code received from a content-providing user of the online system 140. Application of a visual effect to a region of a content item in response to detecting a user action at a client device 110 also may be defined based at least in part on a period of time during which the visual effect is to be applied. For example, a visual effect may be applied to a region of a content item for a given period of time that begins when a user action is detected at a client device 110 at which the content item is being presented.

In some embodiments, in addition to or as an alternative to applying a visual effect to a region of a content item in response to detecting a user action at a client device 110 at which the content item is being presented, an audio effect may be triggered at a client device 110 in response to detecting the user action at the client device 110. In such embodiments, similar to application of the visual effect to the region within the content item, the audio effect also may be defined based at least in part on code received from a content-providing user of the online system 140 and/or a period of time during which the audio effect is to be played. The content store 210 is further described below in conjunction with FIGS. 3, 4A, and 4B.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions in the online system 140, as well as actions in third-party systems 130 that communicate information to the online system 140. Users may interact with various objects in the online system 140, and information describing these interactions is stored in the action log 220.

Examples of interactions with objects include: commenting on posts, sharing links, checking-in to physical locations via a mobile device, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online system 140.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe the rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, a topic, or another user in the online system 140 based on actions performed by the user. Computation of affinity is further described in U.S. patent application Ser. No. 12/978,265, filed on Dec. 23, 2010 (U.S. Publication No. US 2012/0166532 A1, published on Jun. 28, 2012), U.S. patent application Ser. No. 13/690, 254 (U.S. Pat. No. 9,070,141, issued on Jun. 30, 2015), filed on Nov. 30, 2012, U.S. patent application Ser. No. 13/689, 969, filed on Nov. 30, 2012 (U.S. Pat. No. 9,317,812, issued on Apr. 19, 2016), and U.S. patent application Ser. No. 13/690,088, filed on Nov. 30, 2012 (U.S. Publication No. US 2014/0156360 A1, published on Jun. 5, 2014), each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

In some embodiments, a user action described by a content format of a content item is defined based at least in part on a set of APIs stored in the API store 230. In such embodiments, the action detection module 235 (described below) may use the set of APIs stored in the API store 230 to detect a user action at a client device 110 by accessing and interpreting data (e.g., raw motion data) collected by one or more sensors associated with the client device 110. Examples of sensors associated with a client device 110 that may be used to collect data accessed and interpreted by a set of APIs stored in the API store 230 include an accelerometer, a gyroscope, an altimeter, a barometer, a magnetic field sensor, a temperature sensor, a light sensor, a heart rate sensor, an infrared sensor, a GPS sensor, etc. The API store 230 is further described below in conjunction with FIG. 3.

The action detection module 235 detects (e.g., as shown in step 345 of FIG. 3) a user action described by a content format of a content item. As described above, in some embodiments, a user action described by a content format of a content item may be defined based at least in part on a set of APIs stored in the API store 230. In such embodiments, the action detection module 235 detects the user action by using the set of APIs to access and interpret data collected by one or more sensors associated with a client device 110. For example, the online system 140 may receive raw motion data in real time from one or more sensors associated with a client device 110 while a content item is being presented in the display area of the client device 110. In this example, the action detection module 235 may use a set of APIs stored in the API store 230 to interpret the raw motion data and infer a discrete user action (e.g., a shake or a tilt) corresponding to a user action described by a content format of the content item (e.g., using a machine-learning model). The functionality of the action detection module 235 is further described below in conjunction with FIG. 3.

The template store 240 stores one or more templates that may receive information describing content formats of content items from content-providing users of the online system 140. Information describing a content format of a content item may be received via a template in conjunction with a request to create the content item. For example, the online system 140 may retrieve a template stored in the template store 240 for creating content items and may present the template to a content-providing user of the online system 140. In this example, the template may include one or more fields that may be populated by information describing a content format of a content item. Continuing with this example, the information populating the field(s) may describe a user action that is detectable at a client device 110 at which the content item is being presented, a visual effect, and a region of the content item to which the visual effect is to be applied in response to detecting the user action at the client device 110. In this example, the online system 140 subsequently may receive a request from the content-providing user to create the content item based on information received in the field(s) of the template. The template store 240 is further described below in conjunction with FIG. 3.

The content selection module 245 identifies (e.g., as shown in step 320 of FIG. 3) one or more content items eligible for presentation to a viewing user of the online system 140. Content items eligible for presentation to a viewing user are retrieved from the content store 210 or from another source by the content selection module 245. A content item eligible for presentation to a viewing user is a content item associated with at least a threshold number of targeting criteria satisfied by characteristics of the viewing user or is a content item that is not associated with targeting criteria. In various embodiments, the content selection module 245 includes content items eligible for presentation to a viewing user in one or more content selection processes, which identify a set of content items for presentation to the viewing user.

The content selection module 245 may rank (e.g., as shown in step 325 of FIG. 3) content items eligible for presentation to a viewing user of the online system 140 and select (e.g., as shown in step 330 of FIG. 3) one or more of the content items for presentation to the viewing user based on their ranking. The content selection module 245 may rank content items eligible for presentation to a viewing user of the online system 140 based on a measure of relevance associated with each content item to the viewing user or based on any other suitable criteria. The content selection module 245 may then select content items having the highest positions in the ranking or having at least a threshold position in the ranking for presentation to the viewing user. For example, the content selection module 245 determines measures of relevance of various content items eligible for presentation to a viewing user of the online system 140 to the viewing user based on characteristics associated with the viewing user and based on the viewing user's affinity for the content items. In this example, the content selection module 245 selects content items having the highest measures of relevance or having at least a threshold measure of relevance for presentation to the viewing user. Alternatively, in the above example, the content selection module 245 may rank the content items based on their measures of relevance to the viewing user and select content items having the highest ranking or having at least a threshold ranking for presentation to the viewing user.

Content items selected for presentation to a viewing user of the online system 140 may be associated with bid amounts. The content selection module 245 may use the bid amounts associated with content items when selecting content for presentation to a viewing user. In various embodiments, the content selection module 245 determines an expected value associated with various content items based on their bid amounts and selects content items associated with a maximum expected value or associated with at least a threshold expected value for presentation. An expected value associated with a content item represents an expected amount of compensation to the online system 140 for presenting a content item. For example, the expected value associated with a content item is a product of the content item's bid amount and a likelihood of a viewing user presented with the content from the content item interacting with the content. The content selection module 245 may rank content items based on their associated bid amounts and select content items having at least a threshold position in the ranking for presentation to a viewing user. In some embodiments, the content selection module 245 ranks both content items not associated with bid amounts and content items associated with bid amounts in a unified ranking based on bid amounts and measures of relevance associated with content items. Based on the unified ranking, the content selection module 245 selects content for presentation to a viewing user. Selecting content items through a unified ranking is further described in U.S. patent application Ser. No. 13/545,266, filed on Jul. 10, 2012 (U.S. Publication No. US2014/0019261 A1, published on Jan. 16, 2014), which is hereby incorporated by reference in its entirety.

For example, the online system 140 receives a request to present a feed of content to a viewing user of the online system 140. The feed may include one or more advertisements as well as other content items, such as stories describing actions associated with other online system users connected to the viewing user. The content selection module 245 accesses one or more of the user profile store 205, the content store 210, the action log 220, and the edge store 225 to retrieve information about the viewing user. For example, stories or other data associated with users connected to the viewing user are retrieved. The retrieved stories or other content items are analyzed by the content selection module 245 to identify candidate content that is likely to be relevant to the viewing user. For example, stories associated with users not connected to the viewing user or stories associated with users for which the viewing user has less than a threshold affinity are discarded as candidate content. Based on various criteria, the content selection module 245 selects one or more of the content items identified as candidate content for presentation to the viewing user. The selected content items may be included in a feed of content that is presented to the viewing user. For example, the feed of content includes at least a threshold number of content items describing actions associated with users connected to the viewing user via the online system 140.

In various embodiments, the online system 140 presents content to a viewing user through a newsfeed including a plurality of content items selected for presentation to the viewing user. One or more advertisements also may be included in the feed. The content selection module 245 may determine the order in which selected content items are presented via the feed. For example, the content selection module 245 orders advertisements or other content items in a feed based on likelihoods of a viewing user interacting with various content items. The functionality of the content selection module 245 is further described below in conjunction with FIG. 3.

The user interface module 250 may overlay (e.g., as shown in step 335 of FIG. 3) an indicator onto a content item prior to presenting the content item to a viewing user of the online system 140. An indicator overlaid onto a content item may suggest that a viewing user presented with the content item perform a user action described by a content format of the content item. In various embodiments, an indicator overlaid onto a content item may correspond to an icon, an animation, or any other suitable indicator that suggests the performance of a user action described by a content format of a content item to a viewing user of the online system 140 to whom the content item is being presented. For example, if a user action described by a content format of a content item corresponds to shaking a client device 110 at which the content item is being presented, the user interface module 250 may overlay an animation onto the content item suggesting that a viewing user of the online system 140 presented with the content item shake a client device 110 at which the content item is being presented. As an additional example, if a user action described by a content format of a content item corresponds to tilting a client device 110 at which the content item is being presented, the user interface module 250 may overlay an icon onto the content item suggesting that a viewing user of the online system 140 presented with the content item tilt a client device 110 at which the content item is being presented.

In some embodiments, the user interface module 250 also may overlay additional elements onto a content item prior to presenting the content item to a viewing user of the online system 140. In various embodiments, the user interface module 250 may overlay an interactive element onto a content item that allows a viewing user of the online system 140 presented with the content item to reset the content item, such that a visual effect applied to a region of the content item is no longer applied, a result of the visual effect is no longer visible, and/or an audio effect triggered at a client device 110 at which the content item is being presented is no longer played. For example, suppose that a visual effect corresponding to snow falling is applied to a region of a content item in response to detecting that a client device 110 at which the content item is being presented is being shaken and snow appears to accumulate onto a surface within the region. In this example, in response to receiving an interaction with a reset button overlaid onto the content item at the online system 140, the effect application module 255 (described below) may reset the content item, such that the visual effect of snow falling is no longer applied to the region of the content item and the result of the visual effect of snow that appears to have accumulated onto the surface is no longer visible in the content item.

The user interface module 250 may generate a user interface including one or more content items to be presented to viewing users of the online system 140. In some embodiments, a user interface generated by the user interface module 250 may include one or more content items selected by the content selection module 245 for presentation to a viewing user of the online system 140. For example, the user interface module 250 may generate a feed of content items (e.g., a newsfeed) that includes one or more content items selected by the content selection module 245, which the online system 140 presents in a display area of a mobile device associated with a viewing user. As an additional example, the user interface module 250 may generate a display unit including a content item that is presented along the right side of a display area of a client device 110 associated with a viewing user of the online system 140. The functionality of the user interface module 250 is further described below in conjunction with FIG. 3.

The effect application module 255 applies (e.g., as shown in step 350 of FIG. 3) a visual effect described by a content format of a content item to a region of the content item if a user action described by the content format is detected at a client device 110 while the content item is being presented in a display area of the client device 110. For example, suppose that a content item includes an image of a snow globe, in which a visual effect corresponding to snow falling is to be applied to a region of the content item corresponding to the snow globe upon detecting a user action corresponding to shaking a client device 110 while the content item is being presented in a display area of the client device 110. In this example, upon detecting the user action at the client device 110 in conjunction with presenting the content item in the display area of the client device 110, the effect application module 255 applies the visual effect to the region of the content item, such that snow appears to be falling in the snow globe.

In some embodiments, in addition to or as an alternative to applying a visual effect to a region within a content item in response to detecting a user action at a client device 110 while the content item is being presented at the client device 110, the effect application module 255 may trigger (e.g., as shown in step 355 of FIG. 3) an audio effect at the client device 110. For example, suppose that a visual effect may be applied to a region of a content item that corresponds to an image of a can of soda and a glass, such that in response to detecting that a client device 110 at which the content item is being presented is tilted at a certain angle, a visual effect is applied to a region of the content item, such that soda appears to pour from the can into the glass. In this example, a sound of soda pouring into the glass is played at the client device 110, in which playing of the sound is triggered by the effect application module 255 in response to detecting that the client device 110 is being tilted at the angle.

In some embodiments, the effect application module 255 may remove (e.g., as shown in step 360 of FIG. 3) a visual effect applied to a region of a content item, a result of the visual effect, and/or an audio effect triggered at a client device 110. The effect application module 255 may do so after a predetermined amount of time. For example, if a visual effect corresponding to snow falling is applied to a region of a content item in response to detecting that a client device 110 at which the content item is being presented is being shaken, the effect application module 255 may remove the visual effect five seconds after detecting that the client device 110 is being shaken. In this example, if an audio effect triggered at the client device 110 corresponds to bells jingling, the effect application module 255 also may remove the audio effect five seconds after detecting that the client device 110 is being shaken. In such embodiments, the predetermined amount of time may be set by the online system 140 or by a content-providing user of the online system 140 from whom information defining a content format of the content item was received (e.g., based on code received from the content-providing user). In some embodiments, the effect application module 255 may remove a visual effect applied to a region of a content item, a result of the visual effect, and/or an audio effect triggered at a client device 110 in response to receiving a request from a viewing user of the online system 140 to reset the content item (e.g., in response to receiving an interaction with a reset button overlaid onto the content item). The functionality of the effect application module 255 is further described below in conjunction with FIGS. 3 and 5.

The web server 260 links the online system 140 via the network 120 to the one or more client devices 110, as well as to the one or more third-party systems 130. The web server 260 serves web pages, as well as other content, such as JAVA®, FLASH®, XML and so forth. The web server 260 may receive and route messages between the online system 140 and the client device 110, for example, instant messages, queued messages (e.g., email), text messages, short message service (SMS) messages, or messages sent using any other suitable messaging technique. A user may send a request to the web server 260 to upload information (e.g., images or videos) that are stored in the content store 210. Additionally, the web server 260 may provide application programming interface (API) functionality to send data directly to native client device operating systems, such as IOS®, ANDROID™, WEBOS® or BlackberryOS.

Figure 3:
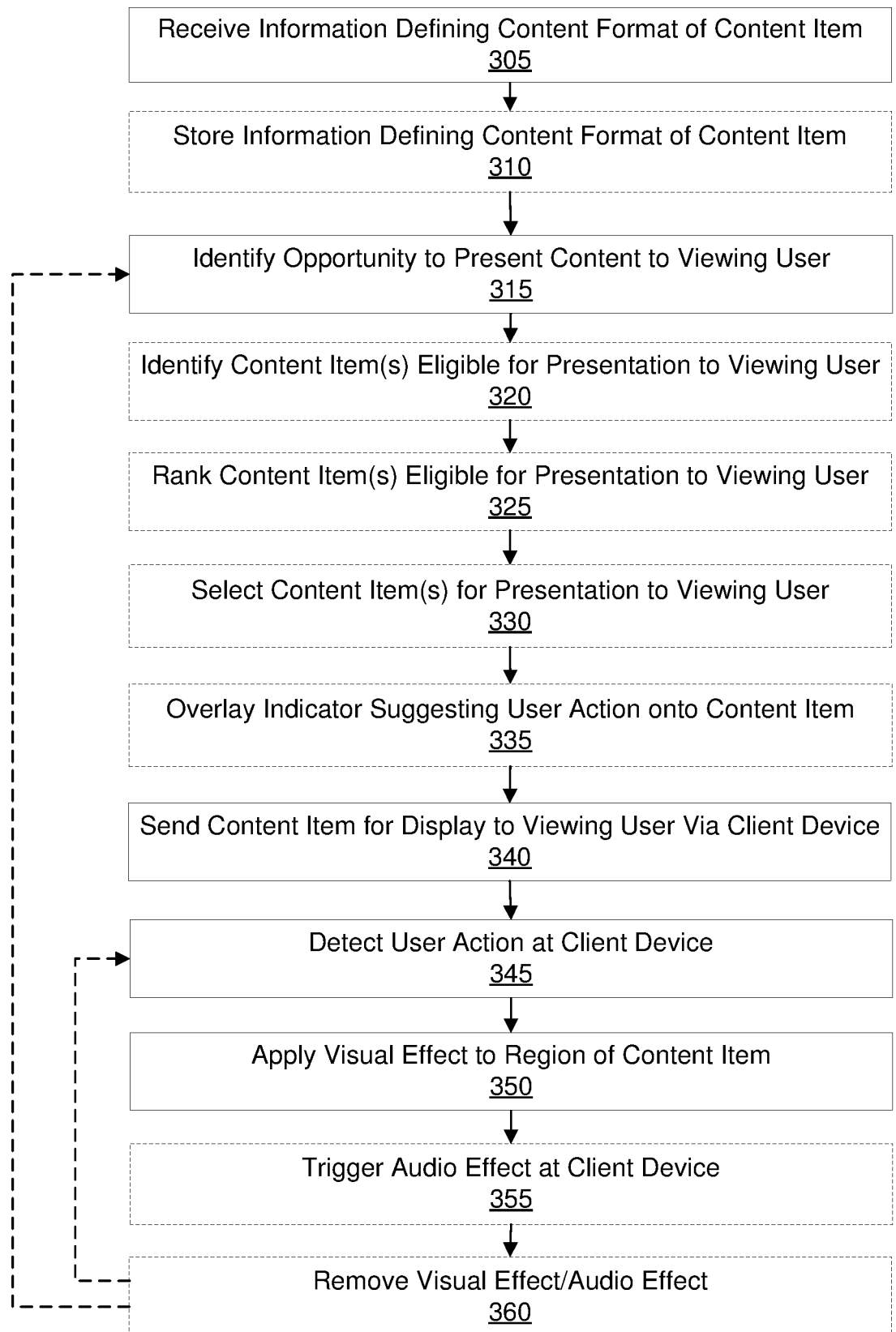
FIG. 3 is a flow chart of a method for applying a visual effect to a region of a content item responsive to detecting a user action in conjunction with presenting the content item at a client device, in accordance with an embodiment.

Applying a Visual Effect to a Region of a Content Item Responsive to Detecting a User Action in Conjunction with Presenting the Content Item at a Client Device FIG. 3 is a flow chart of a method for applying a visual effect to a region of a content item responsive to detecting a user action in conjunction with presenting the content item at a client device. In other embodiments, the method may include different and/or additional steps than those shown in FIG. 3. Additionally, steps of the method may be performed in a different order than the order described in conjunction with FIG. 3.

The online system 140 receives 305 information defining a content format of a content item (e.g., an advertisement) from a content-providing user of the online system 140 associated with the content item. Information defining the content format describes a user action that is detectable at a client device 110 at which the content item is being presented, a visual effect (e.g., rain falling, liquid pouring, etc.), and a region of the content item to which the visual effect is to be applied in response to detecting the user action at the client device 110. In some embodiments, the online system 140 receives 305 the information defining the content format of the content item from the content-providing user in a template maintained in the online system 140 (e.g., in the template store 240) in conjunction with a request to create the content item. In such embodiments, the online system 140 may create the content item having the content format defined based at least in part on the information received 305 in the field(s).

The user action described by the content format of the content item may be detectable at a client device 110 by one or more sensors associated with the client device 110 (e.g., an accelerometer, a gyroscope, an altimeter, a barometer, a magnetic field sensor, a temperature sensor, a light sensor, a heart rate sensor, an infrared sensor, a GPS sensor, etc.). Examples of the user action include shaking a client device 110, moving the client device 110 at one or more speeds, tilting the client device 110 at one or more angles along one or more axes, etc. In various embodiments, the user action may be defined based at least in part on a set of APIs that allow the online system 140 to access data (e.g., raw motion data) collected by one or more sensors associated with a client device 110 in real time.

Figure 4A:
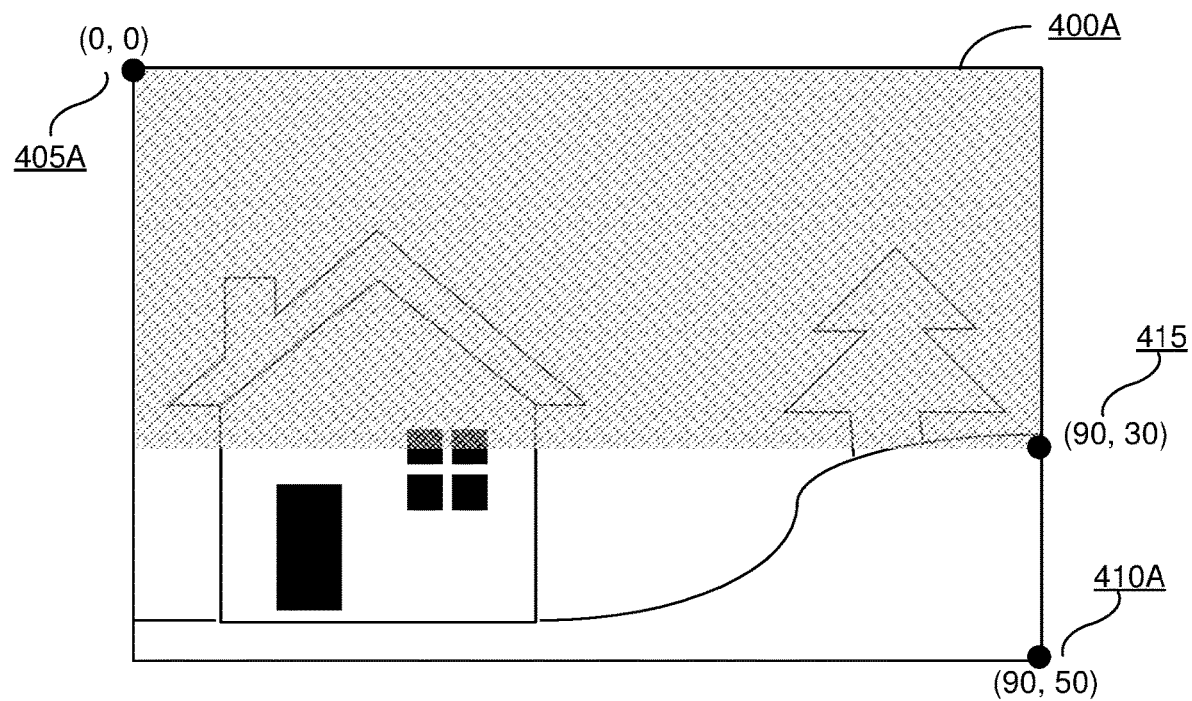
FIG. 4A is an example of identifying a region of a content item to which a visual effect is to be applied based at least in part on a set of coordinates within the content item associated with the region, in accordance with an embodiment.
Figure 4B:
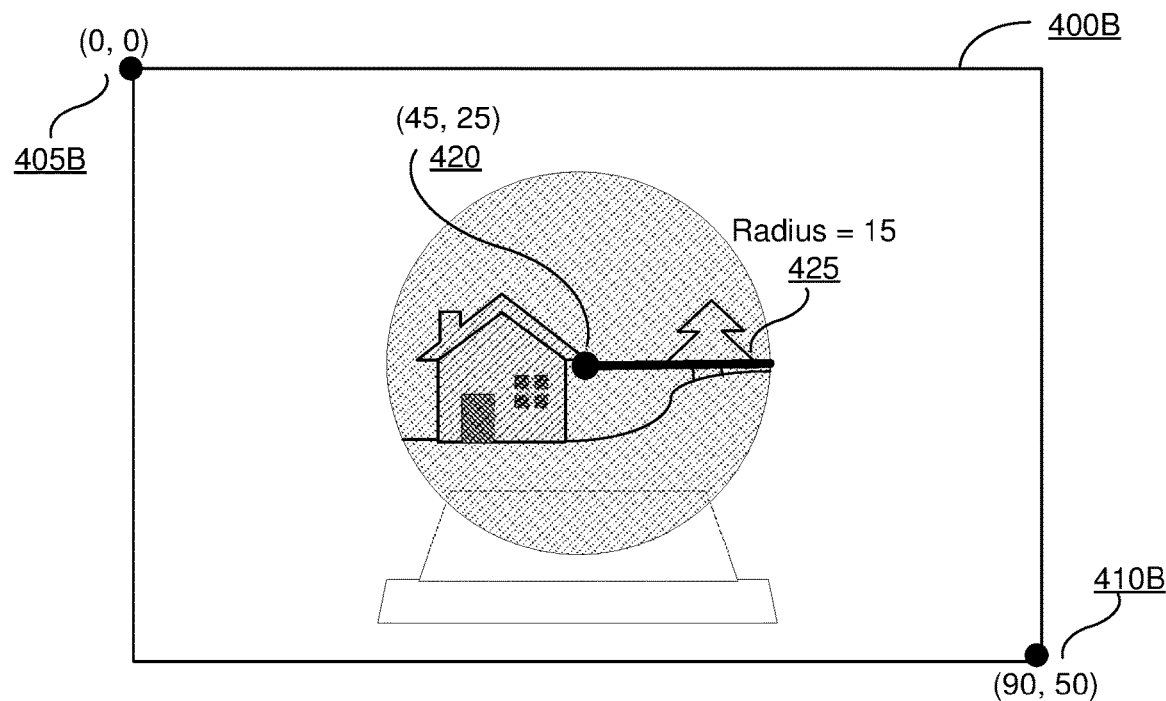
FIG. 4B is an additional example of identifying a region of a content item to which a visual effect is to be applied based at least in part on a set of coordinates within the content item associated with the region, in accordance with an embodiment.

The region of the content item to which the visual effect is to be applied may be identified by the content-providing user of the online system 140 in various ways. In some embodiments, the region may be identified based at least in part on a set of coordinates within the content item associated with the region. In embodiments in which the region of the content item to which the visual effect is to be applied is identified by a set of coordinates within the content item, the coordinates may be expressed in pixels or using any other suitable unit of measurement along an axis of the content item. For example, as shown in FIG. 4A, suppose that a content item 400A is 90 pixels wide and 50 pixels tall, such that an upper-left corner 405A of the content item 400A is identified by the coordinates (0, 0) and that a bottom-right corner 410A of the content item 400A is identified by the coordinates (90, 50). In this example, if a region of the content item 400A to which a visual effect is to be applied is rectangular in shape, a content-providing user of the online system 140 may identify the region by providing coordinates within the content item corresponding to an upper-left corner 405A of the region and coordinates corresponding to a bottom-right corner 415 of the region (i.e., (90, 30)). As an additional example, as shown in FIG. 4B, suppose that an additional content item 400B is 90 pixels wide and 50 pixels tall, such that an upper-left corner 405B of the content item 400B is identified by the coordinates (0, 0) and that a bottom-right corner 410B of the content item 400B is identified by the coordinates (90, 50). In this example, if a region of a content item to which a visual effect is to be applied is circular in shape, a content-providing user of the online system 140 may identify the region by providing coordinates within the content item corresponding to a center 420 of the region (i.e., (45, 25)) as well as a radius 425 of the region (i.e., radius=15). In various embodiments, the region of the content item to which the visual effect is to be applied may correspond to an element within the content item. In such embodiments, a boundary of the region may be identified by the content-providing user of the online system 140 (e.g., using a selection tool that may be used to trace the boundary).

In some embodiments, application of the visual effect to the region of the content item in response to detecting the user action at a client device 110 at which the content item is being presented may be defined based at least in part on code received 305 from the content-providing user. Application of the visual effect also may be defined based at least in part on a period of time during which the visual effect is to be applied. In some embodiments, in addition to or as an alternative to the visual effect to be applied to the region within the content item, an audio effect also may be triggered at a client device 110 in response to detecting the user action at the client device 110. In such embodiments, similar to the application of the visual effect to the region within the content item, the audio effect also may be defined based at least in part on code received from the content-providing user of the online system 140 and/or a period of time during which the audio effect is to be played.

Referring back to FIG. 3, the online system 140 may store 310 the information defining the content format of the content item received 305 from the content-providing user of the online system 140 (e.g., in the content store 210) and then identify 315 an opportunity to present content to a viewing user of the online system 140. For example, the online system 140 may identify 315 an opportunity to present content to a viewing user of the online system 140 upon receiving a request from the viewing user to access a user profile page associated with the viewing user maintained in the online system 140, in which the user profile page includes a newsfeed in which various content items may be presented. As an additional example, the online system 140 may identify 315 an opportunity to present content to a viewing user of the online system 140 upon receiving a request to present a web page maintained in the online system 140 to the viewing user, in which the web page includes a scrollable unit in which advertisements and other types of content items may be presented.

Upon identifying 315 the opportunity to present content to the viewing user, the online system 140 may identify 320 (e.g., using the content selection module 245) one or more content items eligible for presentation to the viewing user (e.g., content items associated with at least a threshold number of targeting criteria satisfied by characteristics of the viewing user and/or content items that are not associated with targeting criteria). The online system 140 may then rank 325 (e.g., using the content selection module 245) the content items eligible for presentation to the viewing user of the online system 140 and select 330 (e.g., using the content selection module 245) one or more of the content items for presentation to the viewing user based on their ranking. The online system 140 may rank 325 the content items eligible for presentation to the viewing user based on a measure of relevance associated with each content item to the viewing user or based on any other suitable criteria (e.g., an expected value associated with each content item or a bid amount associated with each content item). The online system 140 may then select (in step 330) content items having the highest positions in the ranking or having at least a threshold position in the ranking for presentation to the viewing user.

In embodiments in which the content item having the content format defined by the content-providing user is selected 330 for presentation to the viewing user, the online system 140 may overlay 335 (e.g., using the user interface module 250) an indicator onto the content item prior to presenting the content item to the viewing user. The indicator may suggest that the viewing user perform the user action described by the content format of the content item. In various embodiments, the indicator may correspond to an icon, an animation, or any other suitable indicator that suggests the performance of the user action described by the content format of the content item. In some embodiments, the online system 140 also may overlay additional elements onto the content item prior to presenting the content item to the viewing user of the online system 140. In some embodiments, the online system 140 may overlay (e.g., using the user interface module 250) an interactive element onto the content item that allows the viewing user to reset the content item, such that a visual effect applied to the region of the content item is no longer applied, a result of the visual effect is no longer visible, and/or an audio effect triggered at a client device 110 at which the content item is being presented is no longer played.

The online system 140 then sends 340 the content item for presentation to the viewing user via a client device 110 associated with the viewing user. In some embodiments, the online system 140 may include the content item in a user interface generated by the online system 140 (e.g., using the user interface module 250) and send 340 the user interface for presentation to the viewing user. For example, the online system 140 may generate a feed of content items (e.g., a newsfeed) that includes a content item having a content format defined by a content-providing user, which the online system 140 sends 340 for display to a viewing user of the online system 140 via a mobile device associated with the viewing user.

After the content item is sent 340 for display to the viewing user, the online system 140 detects 345 (e.g., using the action detection module 235) the user action described by the content format of the content item in conjunction with presenting the content item in a display area of the client device 110. As described above, in some embodiments, the user action described by the content format of the content item may be defined based at least in part on a set of APIs (e.g., stored in the API store 230). In such embodiments, the online system 140 detects 345 the user action by using the set of APIs to access and interpret data collected by one or more sensors associated with the client device 110. For example, the online system 140 may receive raw motion data in real time from one or more sensors associated with a client device 110 while a content item is being presented in a display area of the client device 110. In this example, the online system 140 may use a set of APIs to interpret the raw motion data and infer a discrete user action (e.g., a shake or a tilt) corresponding to a user action described by a content format of the content item (e.g., using a machine-learning model).

Figure 5:
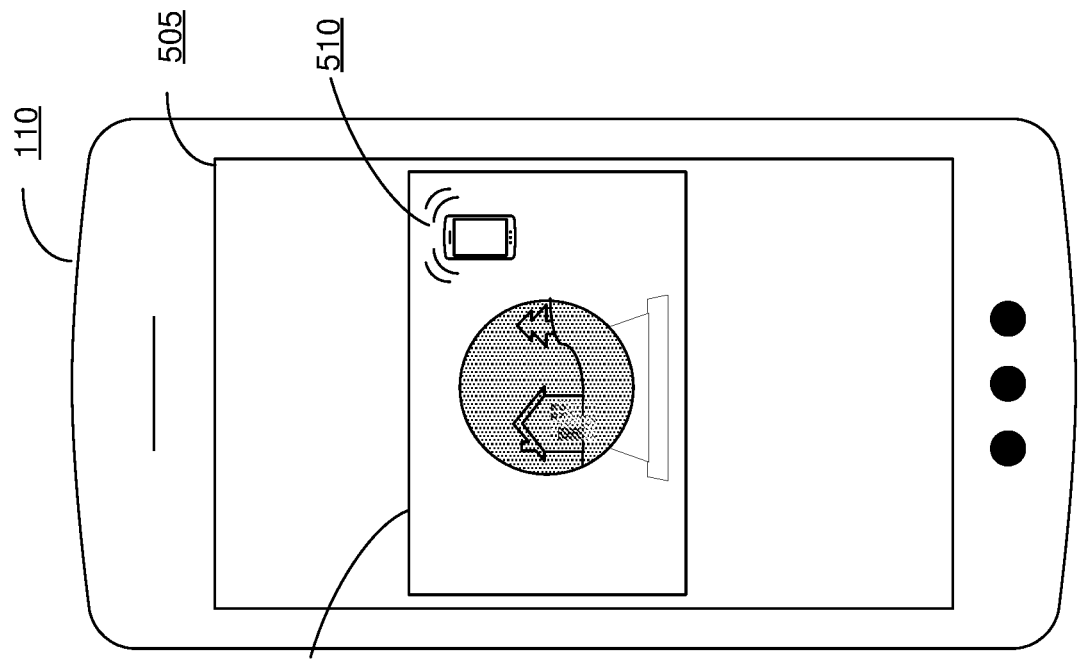
FIG. 5 is an example of applying a visual effect to a region of a content item responsive to detecting a user action at a client device in conjunction with presenting the content item, in accordance with an embodiment.
Figure 5:
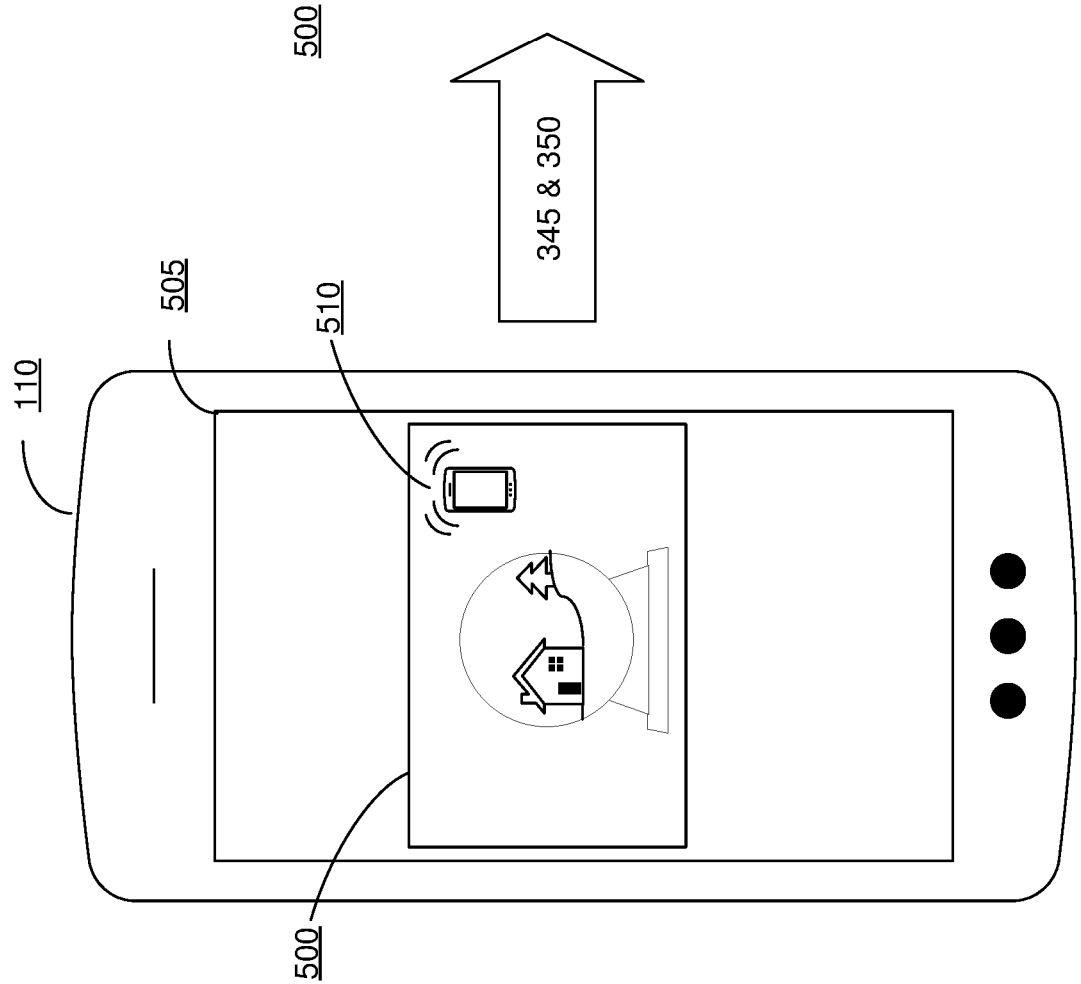

Upon detecting 345 the user action at the client device 110 in conjunction with presenting the content item in the display area of the client device 110, the online system 140 applies 350 (e.g., using the effect application module 255) the visual effect described by the content format of the content item to the region of the content item. For example, as shown in FIG. 5, suppose that a content item 500 includes an image of a snow globe, in which a visual effect corresponding to snow falling is to be applied 350 to a region of the content item corresponding to the snow globe upon detecting 345 a user action at a client device 110 while the content item is being presented in a display area 505 of the client device 110. As indicated by the indicator 510 overlaid 335 onto the content item, in this example, the user action corresponds to shaking the client device 110. Continuing with this example, upon detecting 345 the user action at the client device 110 in conjunction with presenting the content item in the display area 505 of the client device 110, the online system 140 applies 350 the visual effect to the region of the content item, such that snow appears to be falling in the snow globe.

Referring once more to FIG. 3, in some embodiments, in addition to or as an alternative to applying 350 the visual effect to the region within the content item in response to detecting 345 the user action at the client device 110 while the content item is being presented at the client device 110, the online system 140 may trigger 355 (e.g., using the effect application module 255) an audio effect at the client device 110. For example, suppose that a visual effect is to be applied 350 to a region of a content item that corresponds to an image of a can of soda and a glass, such that in response to detecting 345 that a client device 110 at which the content item is being presented is tilted at a certain angle, the visual effect is applied 350 to the region of the content item, such that soda appears to pour from the can into the glass. In this example, a sound of soda pouring into the glass is played at the client device 110, in which playing of the sound is triggered 355 by the online system 140 in response to detecting 345 that the client device 110 is being tilted at the angle.

In some embodiments, the online system 140 may remove 360 (e.g., using the effect application module 255) the visual effect applied 350 to the region of the content item, a result of the visual effect, and/or the audio effect triggered 355 at the client device 110. The online system 140 may do so after a predetermined amount of time. In such embodiments, the predetermined amount of time may be set by the online system 140 or by the content-providing user of the online system 140 (e.g., based on code received 305 from the content-providing user). In some embodiments, the online system 140 may remove 360 the visual effect applied 350 to the region of the content item, the result of the visual effect, and/or the audio effect triggered 355 at the client device 110 in response to receiving a request from the viewing user to reset the content item (e.g., in response to receiving an interaction with a reset button overlaid onto the content item).

In various embodiments, the online system 140 may repeat some of the steps described above (e.g., by proceeding back to the identifying 315 an opportunity to present content to a viewing user of the online system 140 step, to the detecting 345 the user action described by the content format of the content item step, etc.).

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, at an online system from a content-providing user of the online system, information defining a content format of a content item associated with the content-providing user, the information defining the content format describing a user action detectable at a client device at which the content item is being presented, a visual effect, and a region of the content item to which the visual effect is to be applied in response to detecting the user action at the client device;
identifying an opportunity to present content to a viewing user of the online system, the viewing user distinct from the content-providing user;
sending the content item for display to the viewing user of the online system via a client device associated with the viewing user;
detecting, at the online system, the user action at the client device in conjunction with presenting the content item in a display area of the client device, the user action detected by one or more sensors associated with the client device by:
receiving, at the online system from the client device, raw motion data from the one or more sensors associated with the client device; and
inferring, at the online system responsive to receiving the raw motion data, a discrete user action corresponding to the user action using a machine-learning model based on the raw motion data from the client device; and
responsive to detecting the user action at the client device, applying the visual effect to the region of the content item.

2. The method of claim 1, wherein the user action is selected from the group consisting of: shaking the client device, moving the client device at one or more speeds, and tilting the client device at one or more angles.

3. The method of claim 1, further comprising:
responsive to detecting the user action at the client device associated with the viewing user in conjunction with presenting the content item in the display area of the client device associated with the viewing user, triggering an audio effect at the client device.

4. The method of claim 1, wherein application of the visual effect to the region of the content item responsive to detecting the user action is defined based at least in part on code received from the content-providing user of the online system.

5. The method of claim 1, wherein the content item further comprises an indicator suggesting performance of the user action.

6. The method of claim 1, wherein the region of the content item is identified based at least in part on a set of coordinates received from the content-providing user of the online system.

7. The method of claim 1, wherein the region of the content item corresponds to an element comprising the content item.

8. The method of claim 1, wherein the user action is defined based at least in part on a set of APIs.

9. The method of claim 8, wherein detecting the user action at the client device in conjunction with presenting the content item in the display area of the client device comprises:
interpreting the raw motion data using the set of APIs.

10. The method of claim 1, further comprising:
presenting a template to the content-providing user of the online system for creating the content item, the template comprising one or more fields to receive information describing one or more of: the user action, the visual effect, and the region of the content item to which the visual effect is to be applied in response to detecting the user action at the client device;
receiving a request from the content-providing user of the online system to create the content item based at least in part on the information received in the one or more fields of the template; and
creating the content item based at least in part on the received request.

11. A computer program product comprising a non-transitory computer readable storage medium having instructions encoded thereon that, when executed by a processor, cause the processor to:
receive, at an online system from a content-providing user of the online system, information defining a content format of a content item associated with the content-providing user, the information defining the content format describing a user action detectable at a client device at which the content item is being presented, a visual effect, and a region of the content item to which the visual effect is to be applied in response to detecting the user action at the client device;
identify an opportunity to present content to a viewing user of the online system, the viewing user distinct from the content-providing user;
send the content item for display to the viewing user of the online system via a client device associated with the viewing user;
detect, at the online system, the user action at the client device in conjunction with presenting the content item in a display area of the client device, the user action detected by one or more sensors associated with the client device by:
receiving, at the online system from the client device, raw motion data from the one or more sensors associated with the client device; and
inferring, at the online system responsive to receiving the raw motion data, a discrete user action corresponding to the user action using a machine-learning model based on the raw motion data from the client device; and
responsive to detecting the user action at the client device, apply the visual effect to the region of the content item.

12. The computer program product of claim 11, wherein the user action is selected from the group consisting of: shaking the client device, moving the client device at one or more speeds, and tilting the client device at one or more angles.

13. The computer program product of claim 11, wherein the computer readable storage medium further has instructions encoded thereon that, when executed by the processor, cause the processor to:
responsive to detecting the user action at the client device associated with the viewing user in conjunction with presenting the content item in the display area of the client device associated with the viewing user, trigger an audio effect at the client device.

14. The computer program product of claim 11, wherein application of the visual effect to the region of the content item responsive to detecting the user action is defined based at least in part on code received from the content-providing user of the online system.

15. The computer program product of claim 11, wherein the content item further comprises an indicator suggesting performance of the user action.

16. The computer program product of claim 11, wherein the region of the content item is identified based at least in part on a set of coordinates received from the content-providing user of the online system.

17. The computer program product of claim 11, wherein the region of the content item corresponds to an element comprising the content item.

18. The computer program product of claim 11, wherein the user action is defined based at least in part on a set of APIs.

19. The computer program product of claim 18, wherein detect the user action at the client device in conjunction with presenting the content item in the display area of the client device comprises:
interpret the raw motion data using the set of APIs.

20. The computer program product of claim 11, wherein the computer readable storage medium further has instructions encoded thereon that, when executed by the processor, cause the processor to:
present a template to the content-providing user of the online system for creating the content item, the template comprising one or more fields to receive information describing one or more of: the user action, the visual effect, and the region of the content item to which the visual effect is to be applied in response to detecting the user action at the client device;
receive a request from the content-providing user of the online system to create the content item based at least in part on the information received in the one or more fields of the template; and
create the content item based at least in part on the received request.

21. A method comprising:
receiving, at an online system from a content-providing user of the online system, information defining a content format of a content item associated with the content-providing user, the information defining the content format describing a user action detectable at a client device at which the content item is being presented, a visual effect, and a region of the content item to which the visual effect is to be applied in response to detecting the user action at the client device;
sending the content item for display to a viewing user of the online system via a client device associated with the viewing user, the viewing user distinct from the content-providing user;
detecting, at the online system, the user action at the client device in conjunction with presenting the content item in a display area of the client device, the user action detected by one or more sensors associated with the client device by:
receiving, at the online system from the client device, raw motion data from the one or more sensors associated with the client device; and
inferring, at the online system responsive to receiving the raw motion data, a discrete user action corresponding to the user action using a machine-learning model based on the raw motion data from the client device; and responsive to detecting the user action at the client device, applying the visual effect to the region of the content item.

22. The method of claim 21, wherein the user action is selected from the group consisting of: shaking the client device, moving the client device at one or more speeds, and tilting the client device at one or more angles.

23. The method of claim 21, wherein application of the visual effect to the region of the content item responsive to detecting the user action is defined based at least in part on code received from the content-providing user of the online system.

\* \* \* \* \*